(12) United States Patent
Mertens et al.

(10) Patent No.: US 6,227,675 B1
(45) Date of Patent: May 8, 2001

(54) INTERIOR REARVIEW MIRROR FOR VEHICLES

(75) Inventors: Jens Mertens, Stuttgart; Robert Apfelbeck, Plattling, both of (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/642,455

(22) Filed: Aug. 18, 2000

(30) Foreign Application Priority Data

Aug. 18, 1999 (DE) .......................................... 299 14 501 U

(51) Int. Cl.$^7$ ..................................................... G02B 7/182
(52) U.S. Cl. ........................... 359/871; 359/872; 359/873; 359/875; 248/477; 248/478
(58) Field of Search .................................... 359/871, 872, 359/873, 874, 875, 877, 882; 248/477, 478, 481, 484, 549

(56) References Cited

U.S. PATENT DOCUMENTS

| | | | |
|---|---|---|---|
| 4,941,639 | * 7/1990 | Sakao | 248/549 |
| 4,961,638 | * 10/1990 | D'Aquaro et al. | 359/871 |
| 5,327,288 | * 7/1994 | Wellington et al. | 359/606 |
| 5,600,497 | * 2/1997 | Leonberger | 359/875 |

* cited by examiner

Primary Examiner—Mohammad Sikder
(74) Attorney, Agent, or Firm—Gudrun E. Huckett, Patent Agent

(57) ABSTRACT

An interior rearview mirror for vehicles has a housing having an interior. A mirror support has a first end and a second end, wherein the housing is connected to the first end of the mirror support and wherein the first end projects into the interior of the housing. A mirror pane is mounted in an opening of the housing. A switching member is mounted in the interior of the housing and is pivotable on the first end of the mirror support. An adjusting lever is mounted in the housing and projects from the housing. At least one spring is configured to act on the adjusting lever. The adjusting lever is movable against a force of the at least one spring and acts on the switching member for pivoting the mirror pane from a normal viewing position into a non-glare position. The switching member receives the force of the at least one spring exerted onto the adjusting lever and thus prevents deformation of the housing.

25 Claims, 5 Drawing Sheets

INTERIOR REARVIEW MIRROR FOR VEHICLES

BACKGROUND OF THE INVENTION

1. Field of the Invention

The invention relates to an interior rearview mirror for vehicles, especially motor vehicles, comprising a housing with a mirror pane, in particular, a wedge-shaped mirror pane, and comprising a mirror support on which a switching part is supported in a pivotable manner within the housing, which is engaged by an adjusting lever, pivotable against the force of at least one spring, for moving the mirror pane from a rest position into a non-glare position.

2. Description of the Related Art

Interior rearview mirrors of this kind are known in which the adjusting lever is provided for adjusting the mirror pane into the non-glare position. The adjusting lever is loaded by the force of a spring which holds it in its respective positions corresponding to the normal viewing position or the non-glare position of the mirror. The adjusting lever rests under the spring force against the mirror housing. Since especially in the penetration area of the adjusting lever the housing has only a thin wall, the mirror housing is deformed permanently in this area to an impermissible degree. This occurs especially at high temperatures as they occur in summer. Since the adjusting lever is supported against the spring force on the mirror housing, the deformation of the mirror housing results in a decreasing spring load on the adjusting lever. When the mirror housing is adjusted for proper viewing by the driver, it can thus jump accidentally from one into the other position.

SUMMARY OF THE INVENTION

It is an object of the present invention to provide an interior rearview mirror of the aforementioned kind such that impermissible deformations of the mirror housing, caused by heat or resulting during adjustment from one into the other position, can be reliably prevented.

In accordance with the present invention, this is achieved in that the force exerted by the spring onto the adjusting lever is received by the switching member.

As a result of the inventive embodiment, the spring force acting on the adjusting lever is no longer transmitted onto the mirror housing but onto the switching member. Since the switching member is supported on the mirror support and is advantageously made of hard plastic material, impermissible deformations of the mirror housing are reliably prevented. An accidental pivoting of the adjusting lever is reliably prevented.

DESCRIPTION OF THE PREFERRED EMBODIMENTS

Figure 6:
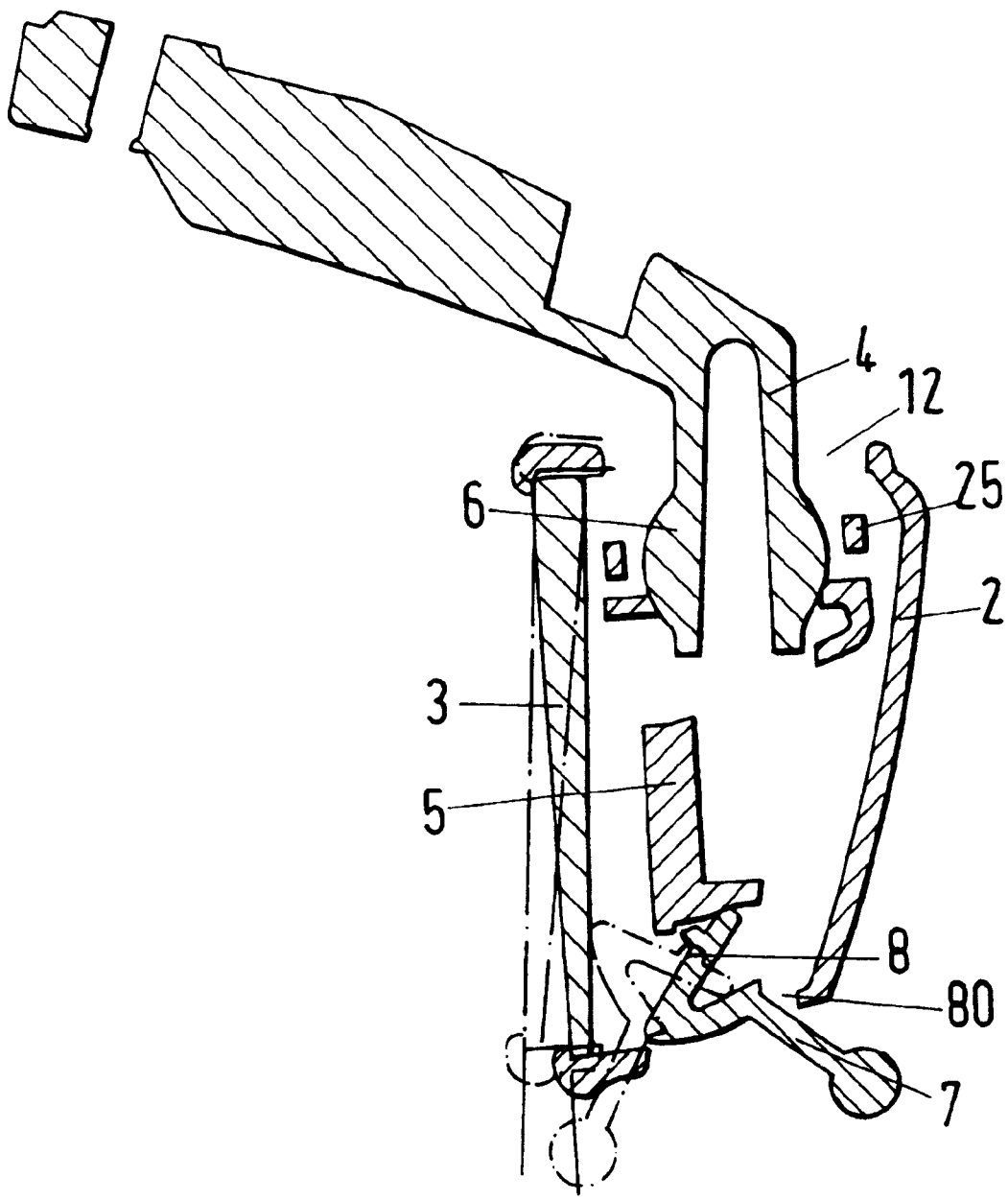
FIG. 6 is a simplified sectional representation of the interior rearview mirror according to FIG. 1 with a mirror support.

The interior rearview mirror 1 has a mirror housing 2 whose opening is closed off by a wedge-shaped mirror pane 3 (FIG. 6). The mirror housing 2 is pivotably seated on a mirror support 4 which projects with its spherical head 6 through an opening 12 into the mirror housing 2. In the mirror housing 2 a switching member in the form of a switching plate 5 is arranged which is seated on the spherical head 6 of the mirror support 4. The interior rearview mirror 1 is fastened by means of the mirror support 4 on a motor vehicle (not shown). An adjusting lever 7 engages the switching plate 5 for tilting the mirror 1. It is supported in the housing 2 and cooperates by means of the spring 8 with the switching plate 5. The switching plate 5 has a pivot axle at the edge located in an upper position when mounted in the housing 2. The pivot axle is formed by laterally projecting pins 9, 10 pointing in opposite directions and projecting past the parallel sidewalls 11, 11' of the switching plate 5. They are monolithic parts of the switching plate 5. The pins 9, 10 are positioned adjacent to a central bearing opening 13 which is provided at the upper edge and faces the housing opening 12. The spherical head 6 is positioned in the central bearing opening 13.

Figure 1:
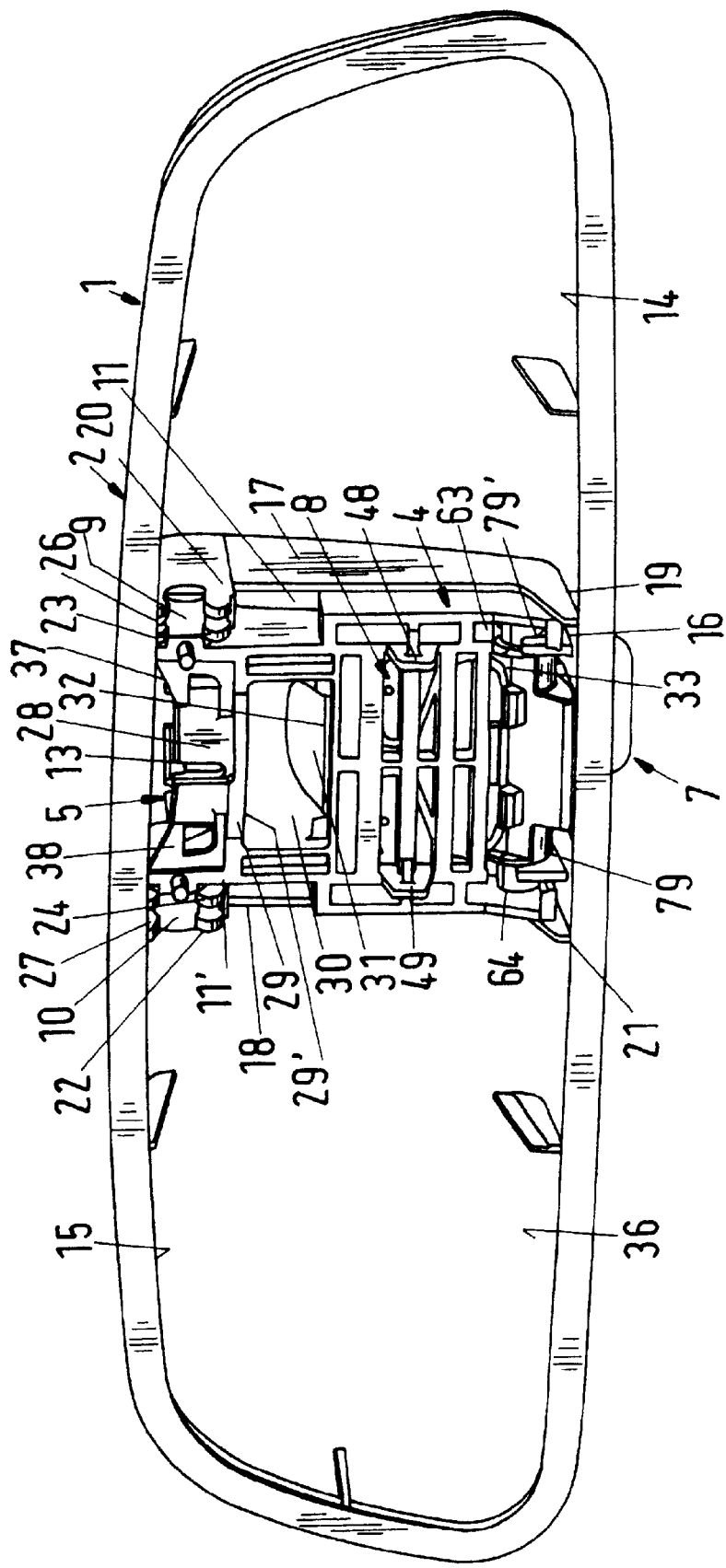
FIG. 1 is a front view of the interior rearview mirror according to the invention without mirror pane.
Figure 2:
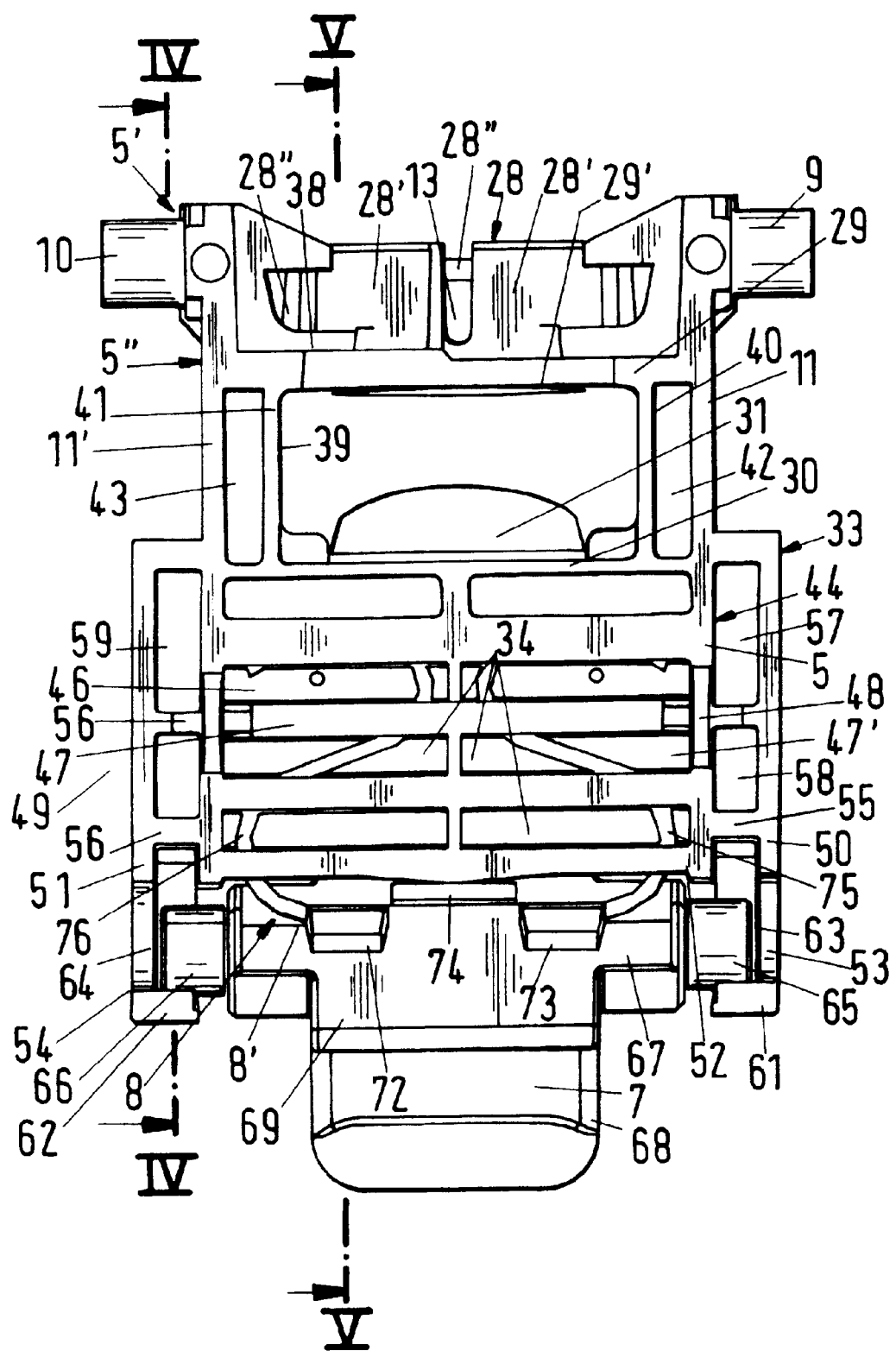
FIG. 2 is an enlarged representation of the adjusting arrangement of the interior rearview mirror according to FIG. 1.

The switching plate 5 in the view according to FIGS. 1 and 2 has a substantially rectangular contour. It extends from the lower longitudinal wall 14 to the upper longitudinal wall 15 of the housing 2. The switching plate 5 is arranged between parallel extending transverse stays 17, 18 of the housing 2 (FIG. 1) which extend perpendicularly to the longitudinal axis of the mirror housing 2. They are formed mirror-symmetrically to one another and adjoin with L-shaped widened ends 19, 20 and 21, 22 the neighboring longitudinal walls 14, 15 of the housing 2, respectively. The transverse stays 17, 18 are monolithic parts of the mirror housing 2 and project perpendicularly from the inner wall of the mirror housing 2. The upper ends 20, 22 of the transverse stays 17, 18 are of a double-wall construction so that they each have a second farther inwardly positioned wall portion 23, 24. The ends 20, 22 or their wall portions 23, 24 are of a V-shaped profile and have an open groove 26, 27 facing the mirror pane 3 in which the bearing pin 9, 10 of the switching plate engage. The groves 26, 27 or bearing openings are designed such that the pins 9, 10 of the switching plate can be inserted into the grooves 26, 27 or removed therefrom only with elastic deformation of the legs delimiting the grooves 26, 27.

The switching plate 5 has substantially three plate portions arranged successively in the longitudinal direction, including a bearing portion 5' having the pins 9, 10, an intermediate portion 5", and a support part 33 which extends approximately across half the height of the switching plate 5 (FIG. 2). The adjusting lever 7 and the spring 8 are supported or arranged on the support part 33.

Figure 3:
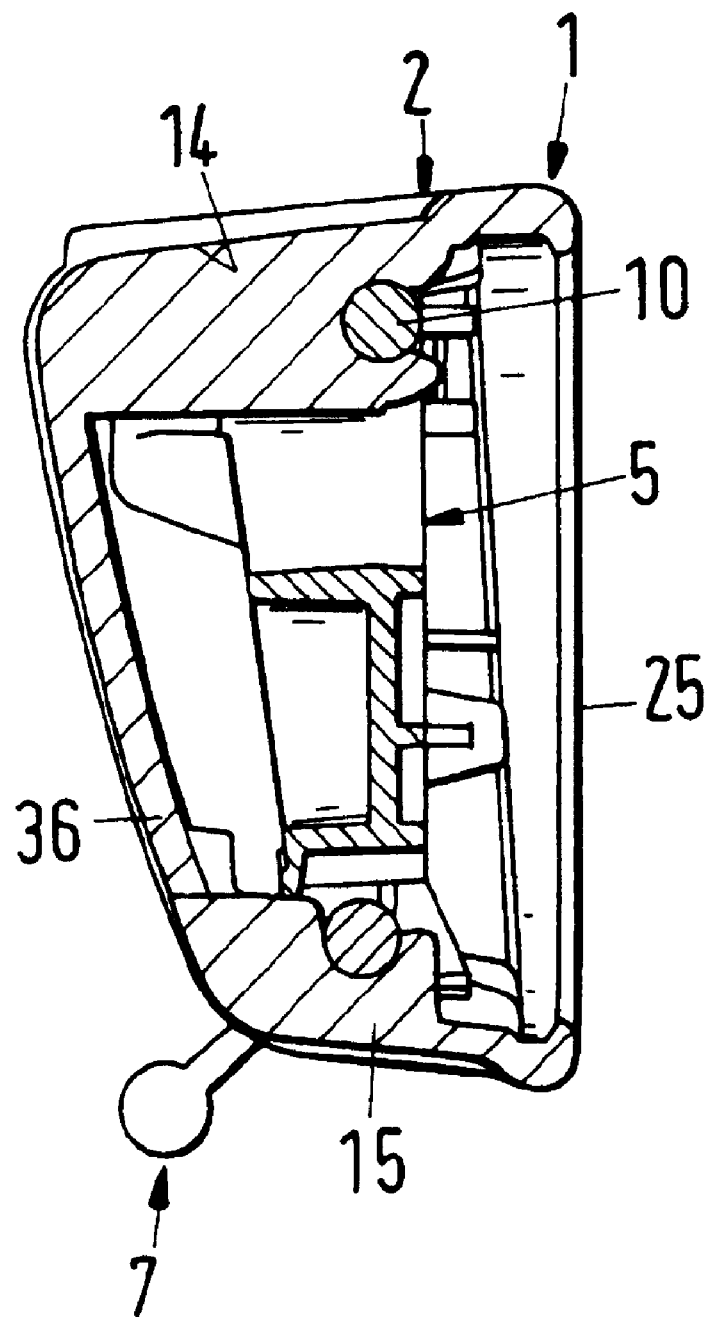
FIG. 3 is cross-section of the interior rearview mirror according to FIG. 1.
Figure 5:
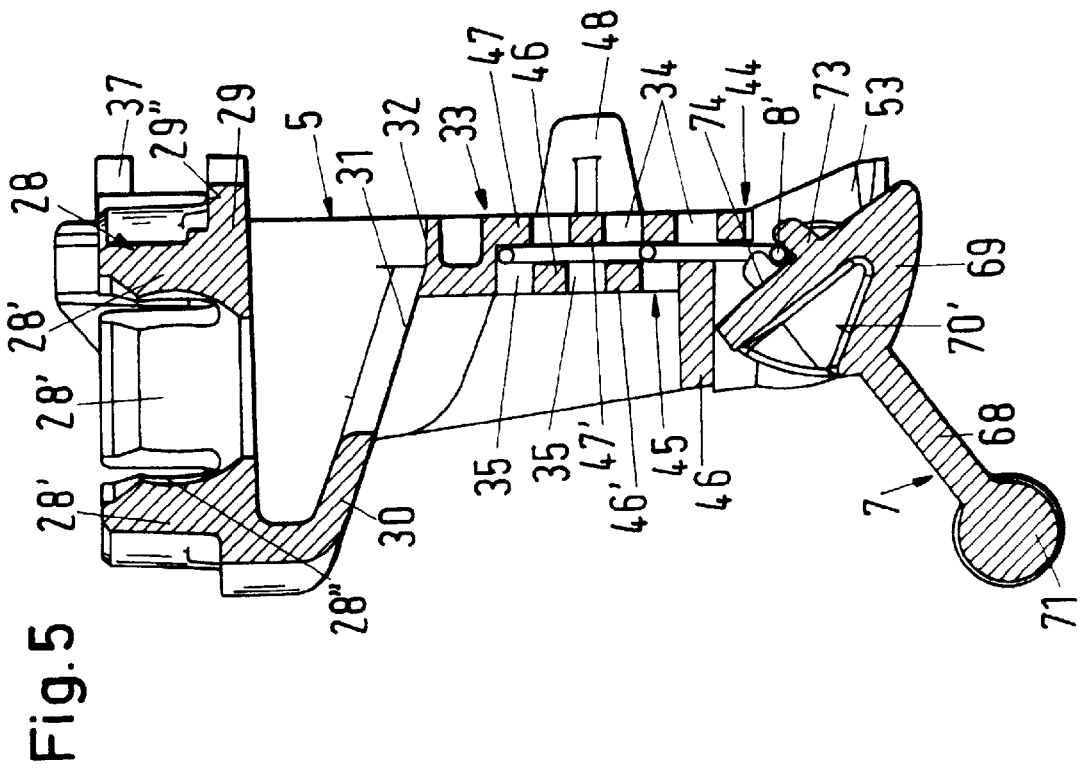
FIG. 5 is a section along the line V—V of FIG. 2.
Figure 4:
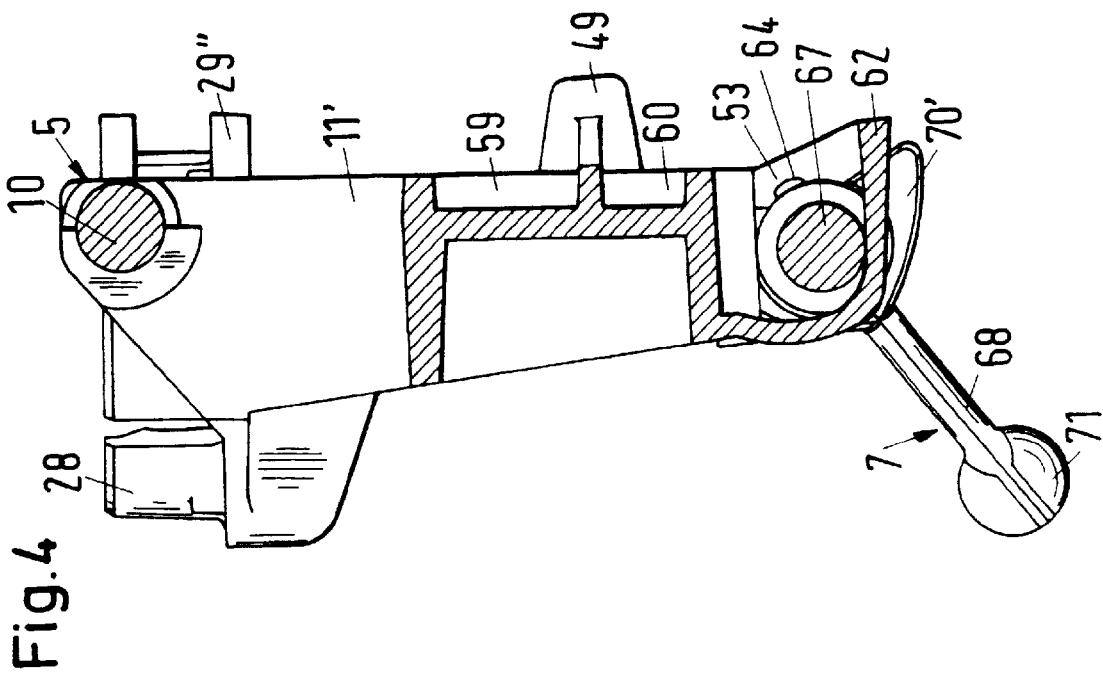
FIG. 4 is a section along the line IV—IV of FIG. 2.

The sidewalls 11, 11' of the switching plate 5 have approximately a trapezoidal shape and extend across the entire plate length (FIGS. 4, 5). In the mounted position the upper bearing part 5' has a central annular collar 28 projecting in the direction toward the upper longitudinal wall 15 of the mirror housing 2 and surrounding the spherical head 6 of the mirror support 4. The annular collar 28, as is shown in FIGS. 4 and 5, projects in the direction toward the bottom 36 (FIGS. 1 and 3) of the housing 2 past the sidewalls 11, 11' of the switching plate 5. The annular collar 28 is slotted about its circumference. It comprises several slots 28" (FIG. 2) open at the edge of the collar 28 and positioned successively in the circumferential direction preferably at the same spacing to one another. The slots 28" are separated from one another by spring-elastic stays 28'. They are elastically spread apart upon slipping the switching plate 5 onto the spherical head 6 and then return elastically in a direction toward their initial position in which they engage the spherical head 6. By means of a spring ring 25 (FIG. 6) which is placed onto the annular collar 28 and which forces the spring stays 28 against the spherical head 6, the spring stays 28' are forced against the spherical head 6. The annular collar 28 projects from a transverse wall 29 in which an opening 29' is provided to allow penetration of the spherical head 6. The transverse wall 29 connects the sidewalls 11, 11' and projects with its edge 29" past the annular collar 28. U-shaped stays 37, 38 (FIG. 2) project perpendicularly from the sidewalls 11, 11' at the side facing the wedge-shaped mirror pane 3. The stays 37, 38 are positioned in a common plane and extend in a direction toward one another. The pins 9, 10, which are aligned with one another and project perpendicularly from the facing outer sides of the sidewalls 11, 11', are positioned at the level of these stays 37, 38.

The transverse wall 29 adjoins a slanted wall 30 (FIG. 5). The slanted wall 30 is positioned at an acute angle to the transverse wall 29 and has an opening 31. At the end face of the switching plate 5 facing the wedge-shaped mirror pane 3 the transverse walls 29 and 30 delimit an opening 39, that is rectangular in an end view, of the intermediate part 5". It is delimited laterally by the edge portions 40, 41 which are provided parallel and with minimal spacing to the inner sides of the inner walls 11, 11'. The edge portions 40, 41 delimit, together with the sidewalls 11, 11' extending parallel thereto, cutouts 42, 43 extending in the longitudinal direction of the switching plate 5, respectively. The slanted wall 30 adjoins the support part 33 which has two stacked grate parts 44, 45 (FIG. 5) which define a receiving chamber for the spring 8 therebetween. The grate parts 44, 45 are provided with transverse slots 34, 35 (FIGS. 2, 5) extending perpendicularly to the longitudinal direction of the switching plate 5. They are positioned in pairs adjacent to one another and successively in a row. They are separated from one another by stays 46, 46", respectively, 47, 47". The transverse slots 34 of the grate part 44 facing the mirror pane 3 are positioned at the level of the stays 46 of the grate part 45 (FIG. 5). At the level of the central grate rods 47, 47' of the upper grate part 44 facing the wedge-shaped mirror pane 3, stay-shaped projections 48, 49 project perpendicularly from the vertical edges of the grate part 44 in the direction toward the wedge-shaped mirror pane 3, respectively. The stay-shaped projections 48, 49 have a trapezoidal shape (FIGS. 4 and 5).

At the outer sides of the sidewalls 11, 11' of the switching plate 5 facing away from one another parallel extending wall portions 50, 51 are provided in the area of the support part 33. The lower ends 53, 54 of the wall portions 50, 51 project past a lower transverse stay 52 of the switching plate 5 in the downward direction and in the direction toward the mirror pane 3. The wall portions 50, 51 are connected by transverse stays 55, 56 with the sidewalls 11, 11'. Depressions 57 through 60 are formed between the wall portions 50, 51, the sidewalls 11, 11', and the stays 55, 56 and extend in the longitudinal direction of the switching plate 5, respectively.

The ends 53, 54 have rectangular, inwardly angled edges 61, 62 which So extend along the edges of the lower ends 53, 54 to the transverse stay 52 which forms the lower edge of the switching plate 5. The edges 61, 62 are positioned at the same level (FIG. 2) and are oriented toward one another. The lower ends 53, 54 of the wall portions 50, 51 and the edges 61, 62 delimit receptacles which are engaged by laterally outwardly projecting tapering ends 65, 66 of a pivot axle 67 of the adjusting or pivot lever 7. Upon pivoting the pivot lever 7, the axis ends or bearing pins 65, 66 are moved on the edges 61, 62 which thus form a link bracket for the pivot lever 7.

The pivot lever 7 comprises a bracket-shaped actuating part 68 that is formed as a monolithic part of the pivot axle 67 by means of an approximately V-shaped connecting part 69 (FIG. 5). One leg 70 of the connecting part 69 has for the purpose of weight reduction of the lever 7 a rectangular depressions 70' (FIG. 5) when viewed in an end view. In a side view the depression 70' tapers in a V-shape in a direction toward the pivot axis 67. The free edge 71 of the actuating bracket 68 is provided with a bead in order to be able to grip the bracket more easily. The pivot axle 67 is flattened at the side facing away from the actuating bracket 68 and has securing members or locking cams 72 through 74 (FIG. 3) projecting past the flattened portion. The locking cams 72, 73 are positioned, when viewed in the axial direction, successively at a spacing, while the locking cam 74 is aligned with a gap between the locking cams 72, 73. As is shown in FIG. 2, the spring 8 engages with a substantially straight wire portion 8' between the cams 72 through 74. The spring 8 has a double-S shape such that its two S-shaped spring portions 75, 76 are positioned mirror-symmetrically to the longitudinal center plane of the switching plate 5. The two spring portions 75, 76 are connected to one another by the straight spring portion 8' which is positioned at a spacing below the transverse stay 52. The oppositely positioned ends 8a, 8b are supported in the intermediate space between the grate parts 44, 45 in the switching plate 5. The spring 8 is tensioned so that it loads the adjusting lever 7 in the two adjusting positions still to be described.

The bearing pins 65, 66 of the adjusting lever 7 are positioned in receptacles 63, 64 of the switching plate 5 and are furthermore rotatably supported in depressions 79, 79' (FIG. 1) of perpendicular stays 16, 16' which project perpendicularly from the inner side of the lower longitudinal wall 14 of the mirror housing 2. The stays 16, 16' are positioned at a spacing between the ends 19, 21 of the transverse stays 17, 18.

In FIGS. 1, 4, and 5 the adjusting lever 7 is represented in its rest position in which it rests by means of its actuating part 68 on the rim of an opening 80 (FIG. 6) provided in the lower longitudinal wall 14 of the mirror housing 2 under the force of the spring 8 (solid lines in FIG. 6). The adjusting lever 7 projects with its actuating part 68 through the opening 80. The bearing pins 65, 66 are positioned in a rearward area of the receptacle 63, 64 of the switching plate 5 which rearward area is facing away from the mirror pane 3. In order to switch the mirror housing 2 into the non-glare position, the adjusting lever 7 is pivoted about the axes of the bearing pins 65, 66 into the position illustrated with dashed lines in FIG. 6. Since the bearing pins 65, 66 of the adjusting lever 7 are positioned at a spacing from the locking cams 72 through 74 and are supported in the stays 16, 16' of the mirror housing 2 in a rotatable manner, a relative pivoting between the switching plate 5 and the mirror housing 2 occurs when pivoting of the adjusting lever 7. This has the result that the mirror housing 2 is pivoted with the mirror pane 3 relative to the switching plate 5 so that the mirror pane 3 reaches its non-glare position. Accordingly, the bearing pins 65, 66 are moved in the receptacles 63, 64 relative to the switching plate 5 in the direction of the end facing the mirror pane 3.

During the pivoting process, the spring 8 is first elastically compressed until, after surpassing a dead center position of the adjusting lever 7, it is again somewhat released and forces the actuating part 68 of the adjusting lever 7 against the other edge of the opening 80 of the mirror housing 2. In the dead center position the spring 8 and the longitudinal center plane of the actuating part 68 of the actuating lever 7 are positioned in a common plane.

The force which is exerted by the spring 8 onto the adjusting lever is so great that the adjusting lever 7 cannot be pivoted back accidentally, for example, by vibrations, into the respective other position. This force is received by the switching plate 5 via the bearing pins 65, 66 of the adjusting lever 7 supported on the edges 61, 62 of the receptacles 63, 64. The thin-walled longitudinal wall 14 of the mirror housing 2, especially in the area of the opening 80, is not loaded by the spring force. Accordingly, deformations of the mirror housing 2 having a negative effect on the pivotability of the adjusting lever 7 are reliably prevented. The stays 16, 16' of the mirror housing 2 are provided only for a rotational support of the adjusting lever 7.

While specific embodiments of the invention have been shown and described in detail to illustrate the inventive principles, it will be understood that the invention may be embodied otherwise without departing from such principles.

What is claimed is:

1. An interior rearview mirror (1) for vehicles, said interior rearview mirror (1) comprising:
   - a housing (2) having an interior;
   - a mirror support (4) having a first end and a second end, wherein said housing (2) is connected to said first end of said mirror support (4) and wherein said first end projects into said interior of said housing (2);
   - a mirror pane (3) mounted in an opening of said housing (2);
   - a switching member (5) mounted in said interior of said housing (2) and configured to pivot on said first end of said mirror support (4);
   - an adjusting lever (7) mounted in said housing (2) and configured to project from said housing (2);
   - at least one spring (8) configured to act on said adjusting lever (7);
   - wherein said adjusting lever (7) is configured to be movable against a force of said at least one spring (8) and to act on said switching member (5) for pivoting said mirror pane (3) from a normal viewing position into a non-glare position;
   - wherein said switching member (5) is configured to receive the force of said at least one spring (8) exerted onto said adjusting lever (7).

2. The interior rearview mirror according to claim 1, wherein said mirror pane (3) is wedge-shaped.

3. The interior rearview mirror according to claim 1, wherein said switching member (5) has a link bracket (63, 64) and wherein said adjusting lever (7) has at least one bearing pin (65, 66) received and guided in said link bracket (63, 64).

4. The interior rearview mirror according to claim 3, wherein said adjusting lever (7) has two of said bearing pins (65, 66) positioned on opposite sides of said adjusting lever (7).

5. The interior rearview mirror according to claim 3, wherein said switching member (5) has wall portions (50, 51) with ends (53, 54) projecting past an end face of said switching member (5) and wherein said ends (53, 54) form said link bracket (63, 64).

6. The interior rearview mirror according to claim 5, wherein said ends of said wall portions (53, 54) have an inwardly projecting edge (61, 62) and wherein said at least one bearing pin (65, 66) rests against said inwardly projecting edge (61, 62).

7. The interior rearview mirror according to claim 1, wherein said switching member (5) has a recess and wherein said at least one spring (8) is arranged in said recess (42).

8. The interior rearview mirror according to claim 7, wherein said switching member (5) comprises an upper element and a lower element and wherein said recess is located between said upper and said lower elements (54, 55).

9. The interior rearview mirror according to claim 1, wherein said first end of said mirror support (4) has a spherical head (6) and wherein said switching member (5) is seated on said spherical head (6).

10. The interior rearview mirror according to claim 9, wherein said switching member (5) has a projecting annular collar (28) having several slots (28') arranged successively and spaced apart in a circumferential direction of said annular collar (28).

11. The interior rearview mirror according to claim 1, wherein said switching member (5) has laterally projecting pins (9, 10) configured to support said switching member (5) in said housing (2).

12. The interior rearview mirror according to claim 11, wherein said housing (2) has bearing openings (26, 27) and wherein said laterally projecting pins (9, 10) are positioned in said bearing openings (26, 27).

13. The interior rearview mirror according to claim 12, wherein said housing (2) has an inner wall with projecting transverse stays (17, 18), wherein said transverse stays (17, 18) have first widened ends (20, 22), and wherein said bearing openings (26, 27) are located in said first widened ends (20, 22).

14. The interior rearview mirror according to claim 13, wherein said widened ends (20, 22) are double-walled.

15. The interior rearview mirror according to claim 13, wherein said housing (2) has longitudinal walls (14, 15), wherein said transverse stays (17, 18) extend between said longitudinal walls (14, 15) and laterally adjacent to said switching member (5).

16. The interior rearview mirror according to claim 15, wherein said transverse stays (17, 18) have second widened ends (19, 20) adjacent to said adjusting lever (7).

17. The interior rearview mirror according to claim 16, wherein said first and second widened ends (19, 20, 21, 22), adjoining said longitudinal walls (14, 15), respectively, extend substantially over an entire height of said longitudinal walls (14, 15).

18. The interior rearview mirror according to claim 13, wherein said inner wall of said housing (2) has a first perpendicular stay and a second perpendicular stay (16, 16') extending parallel to said transverse stays (17, 18), wherein said perpendicular stays (16, 16') are positioned adjacent to said second widened ends (19, 20) on one of said longitudinal walls (14) between said transverse stays (17, 18), respectively.

19. The interior rearview mirror according to claim 18, wherein said adjusting lever (7) has bearing pins (65, 66) and wherein said perpendicular stays (16, 16') each have a substantially semi-circular bearing opening (79, 79') open toward said interior of said housing (2) and configured to receive said bearing pins (65, 66).

20. The interior rearview mirror according to claim 19, wherein said adjusting lever (7) has a pivot axle (67) and said bearing pins (65, 66) form part of said pivot axle (67), wherein said pivot axle (67) further comprises securing members (72–74) configured to limit a securing opening for said at least one spring (8).

21. The interior rearview mirror according to claim 20, wherein first ones of said securing members (72, 73) are positioned aligned with one another and spaced from one another.

22. The interior rearview mirror according to claim 20, wherein two of said first securing members (72, 73) are provided and wherein a second one of said securing members (74) is spaced circumferentially from said first securing members (72, 73) and is aligned with a gap between said two first securing members (72, 73).

23. The interior rearview mirror according to claim 20, wherein said at least one spring (8) has a substantially straight spring portion (8') and wherein said straight spring portion (8') is secured between said securing members (72–74).

24. The interior rearview mirror according to claim 23, wherein said at least one spring (8) is double-S-shaped with two S-shaped portions (75, 76), wherein said two S-shaped portions (75, 76) are arranged mirror-symmetrically relative to a longitudinal axis of said switching member (5).

25. The interior rearview mirror according to claim 24, wherein said S-shaped portions (75, 76) are connected to one another by said straight portion (8').

* * * * *